(No Model.)　　　　　　　O. R. CHASE.　　　　7 Sheets—Sheet 1.

LOZENGE MACHINE.

No. 279,913.　　　　　　Patented June 26, 1883.

WITNESSES　　　　　　　　　　　　　INVENTOR (No Model.)  7 Sheets—Sheet 4.

O. R. CHASE.
LOZENGE MACHINE.

No. 279,913. Patented June 26, 1883.

WITNESSES
Chas. Spaulding
Oscar L. Hammat

INVENTOR
Oliver R. Chase
by W. B. H. Downs
Atty.

(No Model.) 7 Sheets—Sheet 5.

O. R. CHASE.
LOZENGE MACHINE.

No. 279,913. Patented June 26, 1883.

WITNESSES
Harvey H. Pratt
Jno. J. Adams

INVENTOR
Oliver R. Chase
by W. P. H. Down (No Model.)
O. R. CHASE.
LOZENGE MACHINE.
No. 279,913.  Patented June 26, 1883.
7 Sheets—Sheet 6.
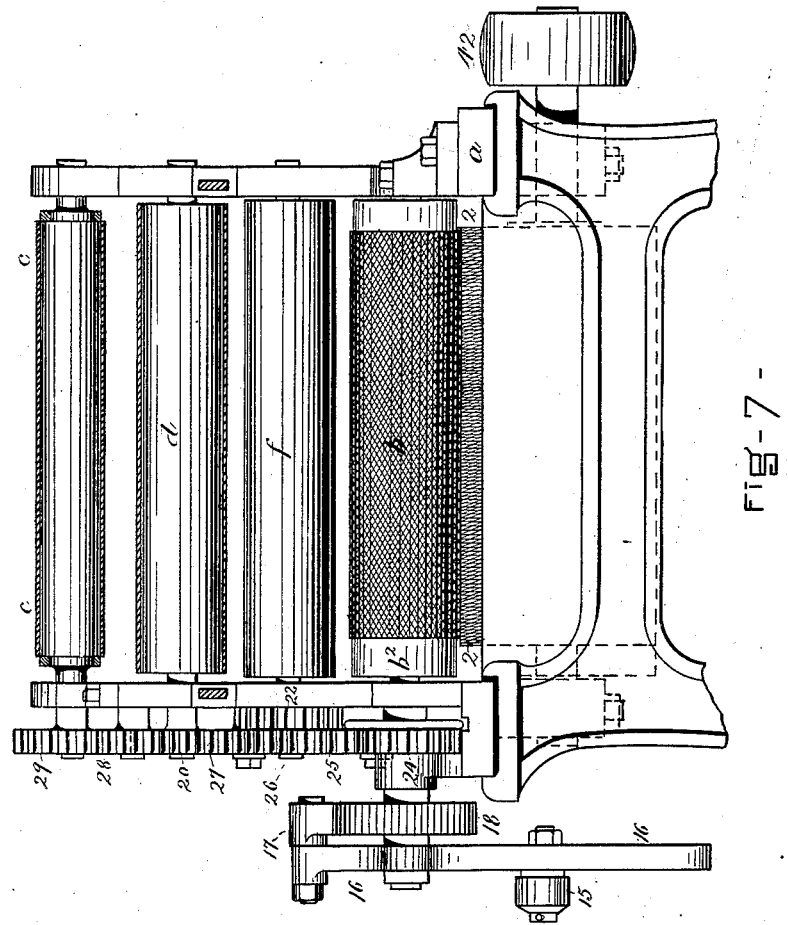
Fig-7-
WITNESSES
Chas. Spaulding.
Oscar F. Hammas.
INVENTOR
Oliver R. Chase
by Wm. B. H. Downs
atty.

(No Model.) 7 Sheets—Sheet 7.

O. R. CHASE.
LOZENGE MACHINE.

No. 279,913. Patented June 26, 1883.

WITNESSES
Chas. Spaulding
Oscar F. Hammar

INVENTOR
Oliver R. Chase
by W. B. H. Dows
atty.

UNITED STATES PATENT OFFICE.

OLIVER R. CHASE, OF BOSTON, MASSACHUSETTS.

LOZENGE-MACHINE.

SPECIFICATION forming part of Letters Patent No. 279,913, dated June 26, 1883.

Application filed May 18, 1883. (No model.)

*To all whom it may concern:*

Be it known that I, OLIVER R. CHASE, a citizen of the United States, residing at Boston, in the county of Suffolk and Commonwealth of Massachusetts, have invented certain new and useful Improvements in Machinery for the Manufacture of Lozenges and Similar Articles, of which the following is a specification.

The invention consists in the construction and combination of parts, hereinafter described, and illustrated in the accompanying drawings, of machinery for the manufacture of lozenges and similar articles.

Figure 1:
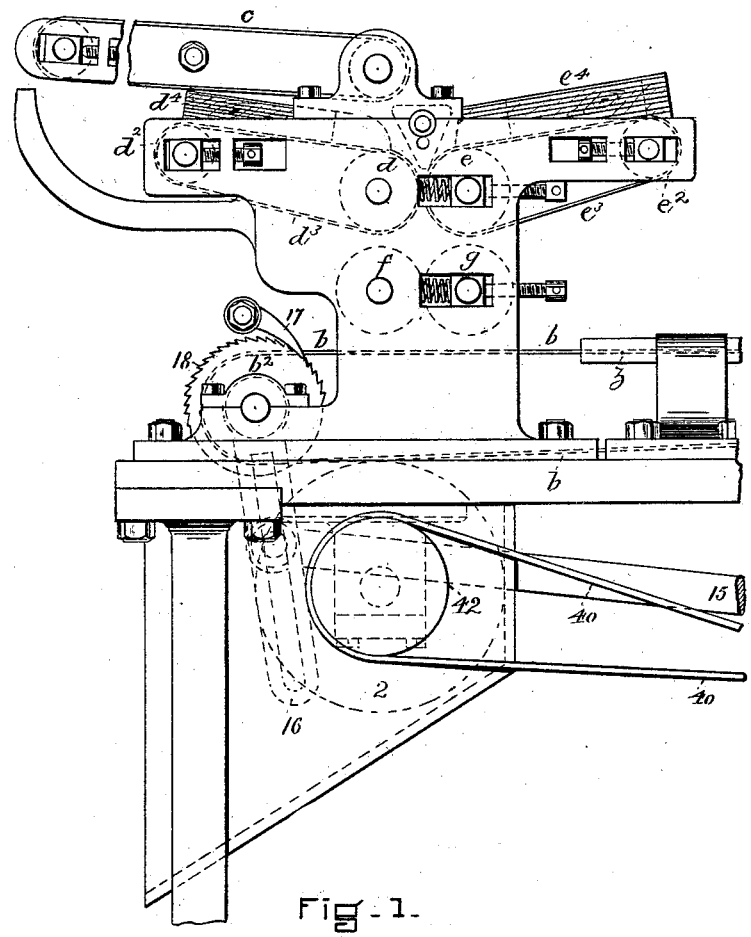
Figure 2:
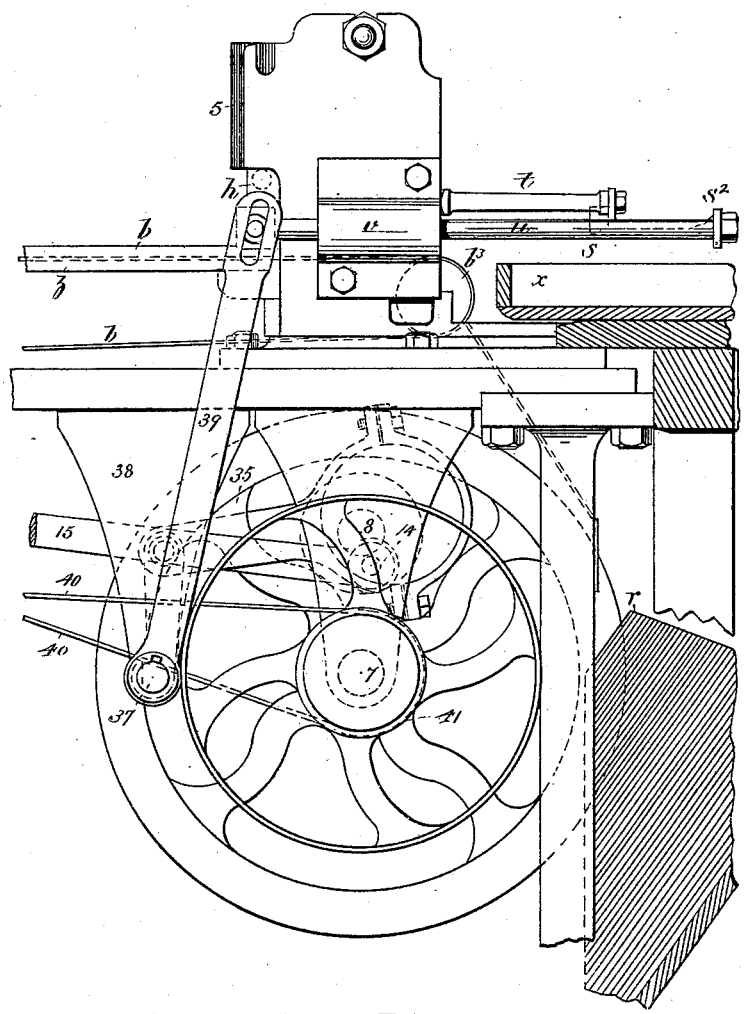
Figure 3:
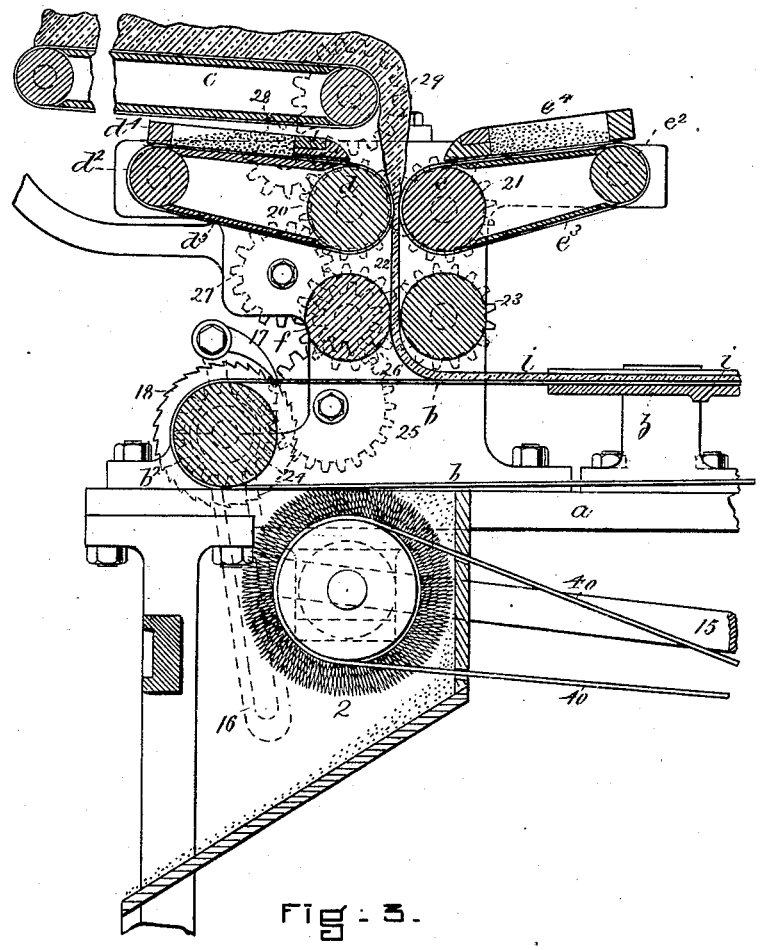
Figure 4:
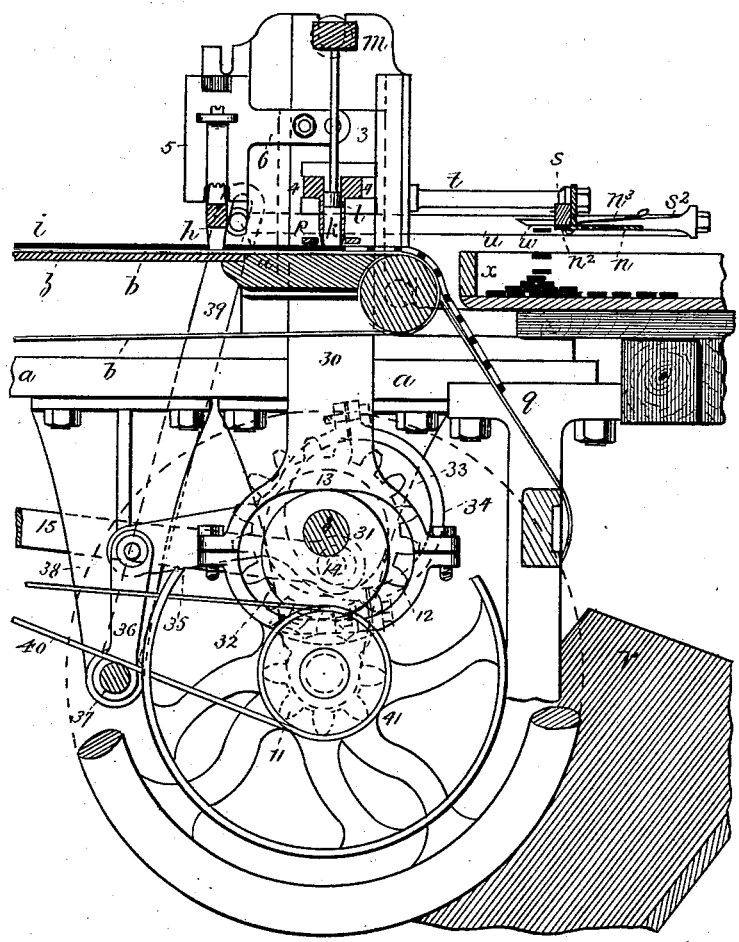
Figure 5:
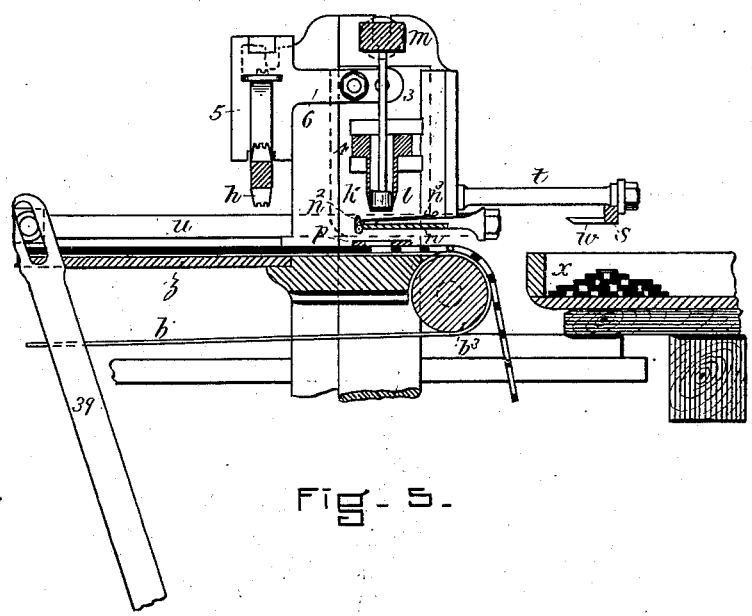
Figure 6:
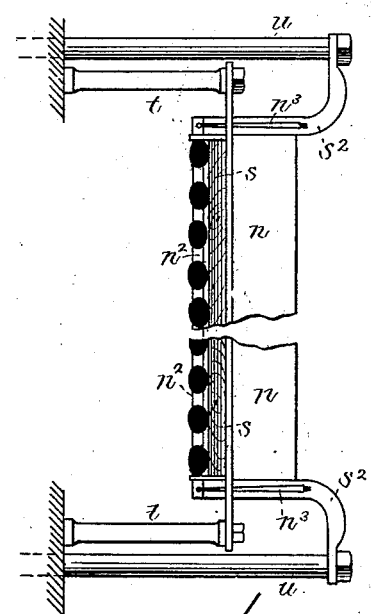
Figure 6:
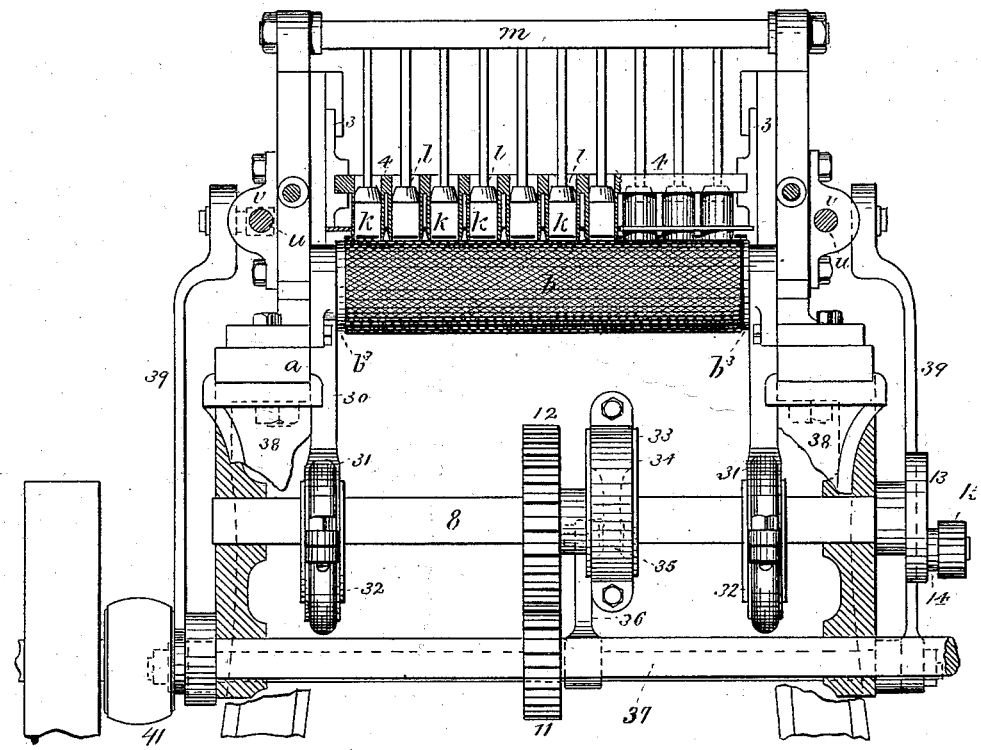

Figures 1 and 2 represent, in side elevation, a machine for the manufacture of lozenges and like articles, the parts of the said machine being constructed and arranged according to my invention. Figs. 3 and 4 represent a longitudinal section of the said machine. Fig. 5 is a portion of Fig. 4, with the tubular cutters in their raised positions and the receiving and removing slide in position for receiving the lozenges as they are stripped or pushed from the cutters. Fig. 6 is a plan of the receiving and removing slide detached. Fig. 7 is an elevation of the feeding end of the machine; and Fig. 8 is an elevation of the opposite end of the machine, the cutters and other parts being represented in cross-section.

In Figs. 1 and 2 and Figs. 3 and 4 portions of the intermittent carrier and the bed-plate of the machine are broken off; but it must be understood that the portions of the machine represented in Figs. 1 and 2 and Figs. 3 and 4 are connected together by the said intermittent carrier and bed-plate, so as to form a connected machine, and not two detached portions, as shown.

The same letters of reference indicate the same parts in the several figures of the drawings.

A is the bed-plate, on which the several parts of the machine are supported.

B is the intermittent carrier, by means of which the sugar-paste is carried in succession under the impressing-dies and the series of cutters. The said carrier B consists of an endless band passing over the pulleys $B^2 B^3$, one at each end of the machine. The sugar-paste is placed on the endless band C, which constitutes the receiver, and the said sugar-paste is fed therefrom between the two pairs of rolls D E and F G, by the action of which the paste is spread out of uniform thickness and its surface made smooth before it reaches the intermittent carrier B.

Over the top pair of feeding and spreading-out rolls, D E, and the pulleys $D^2 E^2$ are endless bands $D^3 E^3$, supported by and traveling over metal frames, against which endless bands the sugar-paste comes in contact, a layer of flour or powdered starch being supplied from the hoppers $D^4 E^4$ and deposited on the endless bands $D^3 E^3$, to prevent the paste adhering to the said bands. The endless bands $D^3 E^3$ form traveling bottoms to the hoppers $D^4 E^4$, a thin continuous layer of flour or powdered starch being carried from the hoppers by the motion of the said bands, as will be understood by an examination of Fig. 3.

The lower pair of feeding and spreading rolls, F G, consist of planishing or bright metallic rolls without endless bands, the nearly dry surface of the sugar-paste coming directly into contact with the said planishing or bright rolls, whereby a very smooth surface is imparted to the sugar-paste before it reaches the intermittent carrier B.

The two pairs of feeding and spreading out rolls D E and F G and the endless bands C D E have an intermittent motion given to them, as hereinafter described.

H is a row of impressing dies or tools crossing the endless carrier B, the several dies of the row being separated from each other at the required distance, so as to impress upon the sugar paste a row of separated inscriptions or designs at the parts to be subsequently cut out by the cutters. The row of impressing dies or tools H has a rising and falling motion given to it, produced as hereinafter described. It is preferred to use a row of double-faced dies, containing on each face a different inscription or design. By turning the row of dies on its center, one or other face may be brought undermost in a position for operating upon the sugar paste. (See Figs. 4 and 5.) After the row of impressing-dies at H has descended upon the paste I on the endless carrier B, so as to impress upon it a row of separated inscriptions or designs, the said row of dies is lifted from the impressed paste and another portion of the said paste is, by the intermittent motion of the carrier B, brought beneath the dies and the action described is repeated. The paste I thus impressed is next carried under a row of movable vertical cutters, K K, having a rising and falling motion. The said cutters K K are hollow or tubular and work over fixed pistons, ejectors, or strippers, L L, carried by the cross-bar M. By the descent of the cutters K K the lozenges are cut from the row of impressed parts of the paste I, as seen in Fig. 4. As the tubular cutters K K rise with the lozenges in their lower open ends (see Fig. 5) the said lozenges are brought against the lower enlarged ends of the fixed pistons or strippers L L, and the said lozenges are pushed from the said cutters and are received on the reciprocating sliding plate or receiver N, which has been brought under the cutters, and by the retiring of the said receiving plate or slide N the lozenges are removed from the machine in the manner hereinafter described. To prevent the cutters K K in their rising motion from taking the strip of paste I with them, the said cutters work through the fixed stripping-plate P. The waste strip of paste from which the lozenges have been cut is carried down the incline Q and falls into the receiver R.

The receiving and removing slide N is constructed in the manner best seen in Figs. 4, 5, and 6. It is represented in Figs. 4 and 6 in its back or retired position, the lozenges being represented in the act of being removed from it, and the said slide is represented in its advanced position in Fig. 5, ready to receive the lozenges as they are stripped from the lifted cutters K K. The said receiving-slide N consists of a flat plate working under the cross-bar or stripper S, the said bar being carried by the fixed brackets T T. The slide N is connected to the curved arms $S^2$ $S^2$, secured to the guide-rods U U, working in the tubular guides V V, fixed on opposite sides of the machine. The free end of the slide N is furnished with a jointed flap, $N^2$, for preventing the lozenges received on the said slide from rolling therefrom. To the ends of the jointed flap $N^2$ india-rubber springs $N^3$ $N^3$ are connected, by which the flap, when at liberty to move, is raised into the acting vertical position represented in Fig. 5. The receiving-slide N works under the horizontal pegs W W, having inclined ends. When the slide N has received the lozenges from the cutters K K, the said slide makes its back motion. As the front end of the slide approaches the fixed bar or stripper S the raised flap $N^2$ is, by coming against the inclined ends of the pegs W W, turned down into the horizontal position represented in Fig. 4, to permit the slide to pass under the cross-bar S, and the said flap is held in that position until the slide makes its advance stroke. As the slide in its back motion passes under the cross-bar or stripper S the lozenges supported on the said slide are stripped therefrom by the said bar or stripper and are received in the tray X. The lozenges are thus, it will be seen, delivered over the edge of the receiving-plate adjacent to the cutters. This is preferable to a delivery over the opposite edge, as the lozenges are not required to traverse the entire length of the receiving-plate, and are not so liable to be bruised or broken. On the reciprocating slide making its forward or advance stroke the flap $N^2$ is lifted into its vertical position, after it has passed from under the bar S and pegs W W, by the action of the springs $N^3$ $N^3$, the raised flap preventing the lozenges received on the slide from rolling therefrom, as will be understood by an examination of Fig. 5.

The strip or sheet of sugar paste is retained on the endless carrier B by the trough-shaped platform Z, between the sides of which it travels. The endless carrier is cleared of adhering particles by means of the rotating brush 2. (Best seen in Fig. 3.) The row of cutters K K is carried by the dovetail slides 3 3 at opposite sides of the machine, the said slides working in dovetails in the frame of the machine. The several cutters are secured to the cross-bar 4, and the latter is fitted to the slides 3 3, as best seen in Fig. 8. The frame 5, carrying the row of impressing-dies, is secured to the cutter-slides 3 3 by side arms, one of which is marked 6.

The motions of the several moving parts of the machine are obtained in the following way: 7 is the driving-shaft, carrying fast and loose driving-pulleys and a fly-wheel. Above and parallel to the driving-shaft 7 is a second shaft, 8, from which the principal motions of the machine are taken. The two shafts 7 and 8 are geared together by the toothed wheels 11 12.

The intermittent motion of the endless carrier B, by which the sheet or strip of sugar paste is in succession carried under the impressing-dies H H and cutters K K, is effected as follows: On the end of the shaft 8 is a crank-plate, 13, to the crank-pin 14, on which the end of the connecting-rod 15 works. (See Fig. 8.) The other end of the connecting-rod 15 is connected to the lower arm of the pawl-lever 16, carrying the pawl 17, the latter alternately engaging with and slipping over the teeth of the ratchet-wheel 18, fixed on the axis of the roller $B^2$, over which the endless carrier B works. The pawl-lever 16 works loosely on the axis of the roller $B^2$. By the oscillating motion, which is, by the arrangement described, communicated to the pawl-lever 16, the pawl 17 gives, at the proper time, the advance motion to the roller $B^2$, and the latter carries forward through the required distance the endless carrier B and the strip of paste upon it during the time the impressing-dies and cutters are making their ascending stroke. The intermittent motion of the feeding and spreading-out and planishing rolls D E and F G and the bands of the upper pair of rolls and the receiving-band C is effected from the roller $B^2$ of the endless carrier B by the train of toothed gearing. (Best seen in Figs. 3 and 7.) The upper pair of rolls, D E, are geared together by the toothed wheels 20 and 21, and the lower planishing pair of rolls, F G, are geared together by the toothed wheels 22 and 23. On the axis of the roller B² of the endless carrier B is a toothed wheel, 24, which gears with the toothed wheel 25, and the latter gears with a smaller toothed wheel, 26, on the axis of the roll F, and thereby gives motion to the geared rolls F G, the said rolls, moving in opposite directions. The wheel 26 on the roll F gears with the toothed wheel 20 on the roll D of the upper pair of geared rolls, D E, and thereby communicates motion in opposite directions to the said rolls D E. The endless bands D³ E³ of the hoppers are worked by the motion of the upper pair of rolls, D E. The endless band C, constituting the sugar-paste receiver, is worked by the toothed wheels 28 29, the wheel 28 receiving motion from the toothed wheel 20 on the roll D.

The rising and falling motions of the slides 3 3, and through the said slides the cutters K K and impressing-dies H H, are effected by the rods 30 30, having at their lower ends eccentric or loop clips 32 32, within which looped clips 32 32 the eccentrics 31 31 on the shaft 8 work. By the motion of said eccentrics 31 31 the eccentric-rods 30 30 are raised and lowered at the proper times, and through them the slides 3 3, cutters K K, and impressing-dies H H.

The reciprocating motion of the receiving and removing slide or plate N is effected in the following manner: On the shaft 8 is a third eccentric, 33, working in the eccentric clip 34, the free end of the rod 35 of the said clip being jointed to the arm 36 on the rocking shaft 37, working in bearings in the hanging brackets 38 38 at opposite sides of the machine.

Fixed on the ends of the rocking shaft 37 are connecting-rods 39 39, in the slotted upper ends of which the ends of the guide-rods U U of the removing slide or the plate N work. (See the elevation Fig. 2, and end elevation Fig. 8.) The rocking motion of the shaft 37 is thereby made to effect, through the connecting-rods 39 39, a reciprocating sliding motion in the receiving plate or slide N, and the lozenges are received on and removed from the said plate in the manner before described. The rotating brush 2, by which adhering particles are removed from the endless carrier B, is driven by the cross driving-band 40, working over a pulley, 41, on the driving-shaft 7, and over a pulley, 42, on the shaft of the said rotating brush.

Instead of employing impressing-dies, a printing-roller may be combined in the machine when it is wished to print inscriptions or designs upon the sugar paste, instead of impressing the said sugar paste.

Having now described the nature of the said invention and the manner in which the same is to be performed, I claim—

1. The combination, with the cutters or dies, pistons or ejectors, receiving-slide, and mechanism for reciprocating the latter, of dumping devices in addition to said mechanism acting to deliver the lozenges from the receiving-slide over the edge adjacent to the cutters, substantially as described.

2. The combination, with the hoppers having side walls surrounding the interior thereof, of the endless belts forming the bottoms of said hoppers, substantially as described.

3. The combination of the hoppers having side walls surrounding the interior thereof, the endless belts forming the bottoms of said hoppers, the carrier, and cutters, substantially as described.

4. The combination of the receiving-slide, jointed flap, springs, pegs, and stripper, substantially as described.

5. The combination of the cutters or dies and pistons or ejectors with the receiving-slide, means, as indicated, for inserting and withdrawing it from under the cutters or dies, and strippers, substantially as described.

6. The combination, with the hoppers and endless belts and top feeding and spreading rolls, over which the endless belt passes, of the planishing-rolls having a bright metallic surface, and operating substantially as described.

7. The combination of the hoppers, endless belts, top feeding-rolls, planishing-rolls, carrier, cutters, and pistons, substantially as described.

8. The machine for making lozenges or similar articles, comprising, in combination, the main driving-shaft, the endless carrier-belt, the pawl and ratchet operated from the main shaft by a crank-pin and connecting-rod for moving the carrier intermittently, the top feeding-rolls, with their belts and hoppers, and planishing-rolls geared to the rolls supporting the carrier and operating alternately with the latter, the cross-head carrying the cutters and stamping devices and operated by an eccentric on the main shaft, the stationary pistons, and the receiving-slide operated through the intermediary of a rocking-lever by an eccentric on the main shaft, the several parts being constructed and operating substantially as described.

In witness whereof I have hereunto set my hand.

OLIVER R. CHASE.

Witnesses:
WM. B. H. DOWSE,
WM. B. WRIGHT.